Jan. 10, 1950   H. B. GROW   2,494,239
MECHANICAL KALEIDOSCOPE
Filed Aug. 2, 1947
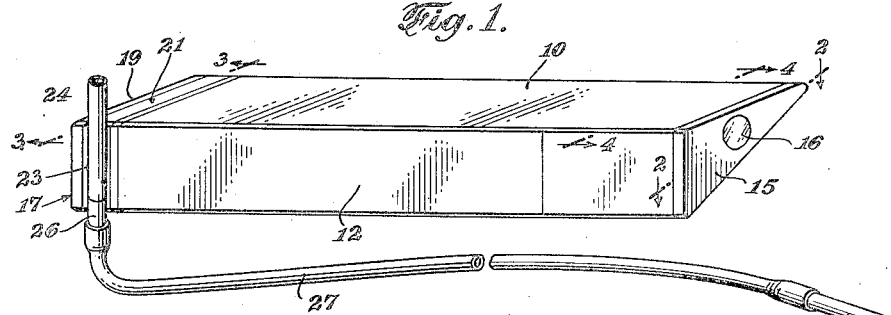
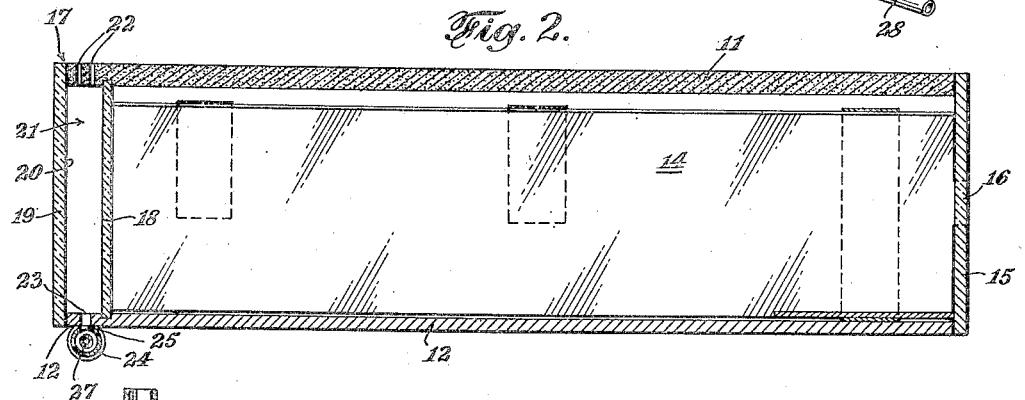
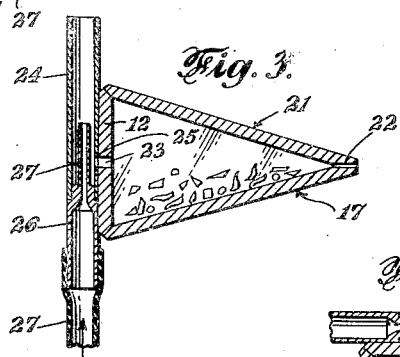
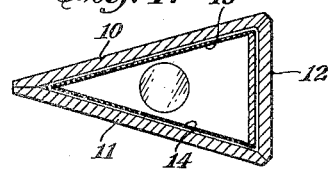
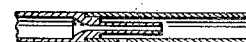
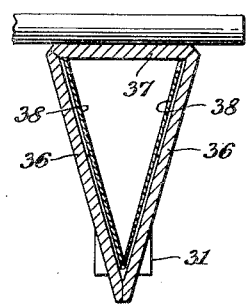
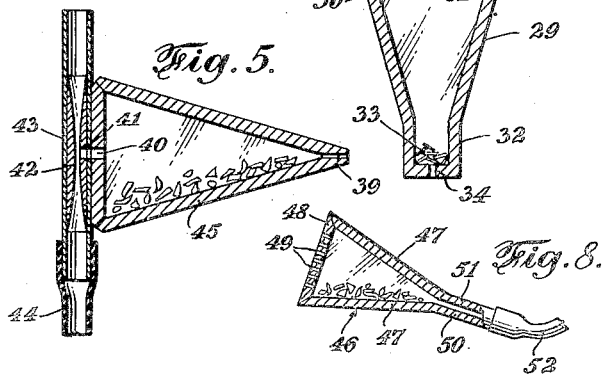
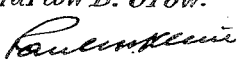
INVENTOR
Harlow B. Grow.
BY
ATTORNEY Patented Jan. 10, 1950

2,494,239

UNITED STATES PATENT OFFICE 2,494,239

MECHANICAL KALEIDOSCOPE

Harlow B. Grow, Linden, Mo.

Application August 2, 1947, Serial No. 765,723

7 Claims. (Cl. 88—15)

This invention relates to kaleidoscopes generally, and particularly to an improvement in the construction and operation of the viewer compartment and of the matter placed therein to be viewed.

One of the principal objects of the present invention is to provide a kaleidoscope wherein the matter to be viewed, such as colored particles, placed in the viewer compartment, may be moved or agitated to change position without the requirement of bodily moving, shaking or in any other way altering the position of the device.

A more specific object of this invention is to provide a kaleidoscope with a viewer containing observable particles which are adapted to change position while the kaleidoscope and the viewer remain substantially at a standstill, and wherein exterior means are provided, operable at will by the observer, for imparting motion to such particles.

A further object of this invention is to provide in a kaleidoscope a viewer comprising a compartment having an interior transparent and exterior mat or translucent wall, and in which compartment are placed particles capable of movement by a surge of air injected into the compartment, and wherein means are provided to facilitate the passage of air through the compartment for the purpose of agitating and changing at will the position of the particles to be viewed within the compartment.

A still more specific object of this invention is to provide a kaleidoscope body of a substantially wedge-shaped form having three opaque sides and two angularly disposed mirrors within, and which body is provided with an opaque closure at one end, the latter being equipped with an eye piece, a viewer compartment at the opposite end, and in which viewer compartment are arranged oppositely disposed air passages, to one of which passages is connected a conduit extending from the compartment a sufficient distance to a point in front of the eye piece so that the observer may blow air through the conduit into the compartment, said compartment containing particles intended to be agitated by the air traversing the compartment, whereby their relative position is altered.

The foregoing and numerous other objects and important advantages of the present invention will become more fully apparent from the ensuing description, in conjunction with the accompanying drawings, wherein:

Fig. 1 is a perspective view of a presently preferred form of the kaleidoscope;

Fig. 2 is a section taken along a vertical plane indicated by line 2—2 in Fig. 1;

Fig. 3 is a section on a vertical plane indicated by line 3—3 of Fig. 1, and showing one form of the air passages and of the air supply arrangement in the compartment;

Fig. 4 is a section on a vertical plane indicated by line 4—4 of Fig. 1;

Fig. 5 is a vertical section through a viewer compartment disclosing a modified form of an air supply arrangement;

Fig. 6 is a section through another embodiment of a viewer compartment with an air supply arrangement similar to that disclosed in Fig. 3;

Fig. 7 is a vertical section through a kaleidoscope employing a viewer compartment indicated in Fig. 6; and Fig. 8 is a section through still another viewer compartment with modified air supply means.

Referring now more specifically to the figures, and especially to Figs. 1 to 4, numeral 10 denotes the relatively broad, substantially opaque upper side or top portion of the kaleidoscope body, while the corresponding broad bottom side thereof is indicated at 11, and numeral 12 denotes the relatively narrow connecting member for sides 10 and 11.

As observed from Figs. 1 and 3 to 8, it is preferred that the body of the kaleidoscope structure is substantially wedge-shaped so that a vertical cross section therethrough corresponds to an isosceles triangle, of which sides-connecting member 12 forms the base. Within the body of the kaleidoscope there are arranged two mirrors 13 and 14 along the inner faces of the sides 10 and 11, respectively. At one end the kaleidoscope body is provided with a preferably opaque closure 15 equipped with an eye piece or lens 16. At the opposite end there is arranged a viewer compartment or chamber generally indicated at 17 and, as shown in Fig. 2, comprising an interior transparent member 18 and an exterior translucent member 19, such as a glass ground at one face as denoted at 20. These two compartment members are spaced from each other by a preferably opaque frame 21. In this frame, composed either of three pieces joined together, as shown in Fig. 3, or of a continuous frame structure, there are provided two oppositely disposed sets of air passages, one set 22 at the acute point of the frame joining the ends of the two longer sides thereof, and another set 23 placed at about the center of the base 12 connecting the two frame sides. Instead of a set of several apertures in the base there may be only a single opening as shown. Connected with the base is a tube 24 having a perforation 25, which latter registers with aperture 23. Tube 24 is connected to another tubular member 26 which has a reduced tubular element 27 extending into tube 24 so that the element passes aperture 23.

Connected at one end with tubular member 26 is a conduit 27, such as rubber tubing, while at its other end there is provided a mouthpiece 28. The tube is sufficiently long so that mouthpiece 28 may be positioned at any convenient point substantially beyond closure 15 to permit the observer holding the kaleidoscope to blow into the mouthpiece. The construction of tube arrangement 24, 26 and 27 is that of an aspirator. When air is blown through mouthpiece 28 into tube 26 and passes through reduced tubular element 27 into tube 24, the air passing out through tube 24 draws air through passages 22 into compartment 17 and from there through apertures 23 and 25 into tube 24. Within the compartment there are placed relatively light particles, preferably made from differently colored material, which particles are light enough to become agitated by the air entering through passages 22 and escaping through passage 23. These particles or objects, designed to be observed through objective 16, are adapted to change their relative position, due to the gust of air passing through chamber 17, at any time the observer blows into mouthpiece 28. In practice, the device is preferably held in a position similar to that indicated in Fig. 8 so that one of the wide sides of the kaleidoscope is placed substantially into a horizontal position. The kaleidoscope is not moved bodily as is usually the case with kaleidoscopes having circular viewers in which the particles have to be "tumbled." Nevertheless the present structure may be also held in any other desired position, different from that indicated in Fig. 8, but as stated, no movement is necessary of the kaleidoscope body in order to change the relative position of the particles or objects to be viewed, since their movement and repositioning is affected by the gust of air passing through the viewer when the observer blows air into mouthpiece 28.

Such other position of the kaleidoscope is indicated in Figs. 6 and 7. In Fig. 6 there is disclosed a viewer 29 having two relatively broad sides 30 and a relatively narrow side 31, opposite which there will be seen a compartment extension 32, which is adapted for the reception of particles or objects to be viewed, indicated at 33. One or more passages 34 are provided in bottom of extension 32, while a single passage 35 is located at the center of narrow side 31 of the viewer. Attached to that narrow side is an ejector structure such as illustrated in Fig. 3.

In Fig. 7 the relatively broad sides of the kaleidoscope are denoted at 36, while the relatively narrow base 37 is shown to connect the broad sides of the kaleidoscope body. Also in this structure there are provided mirrors 38 along the interior faces of broad sides 36.

A somewhat different construction of the air supply arrangement is presented in Fig. 5, where instead of the ejector structure seen in Figs. 3 and 6, a Venturi principle is employed. In this figure the viewer compartment again consists of a structure similar to that disclosed in Fig. 3, which is provided with an inlet air passage 39 and an outlet passage 40, which latter registers with a passage 41 extending into the narrowed portion 42 of tube 43. When air is blown through tube 43 by way of conduit 44 the high velocity of air passing over aperture 41 draws air through passages 39 into the viewer compartment and out through passage 40 into tube 43.

When lower side 45 of the compartment is held in a substantially horizontal position, such as indicated in Fig. 8, the particles within the compartment are agitated in the same manner as those in all other modified forms shown.

In the embodiment of the kaleidoscope disclosed in Fig. 8, viewer compartment 46 consists of relatively broad sides 47 and a relatively narrow base 48, which latter has a plurality of perforations 49, whereas at the juncture of broad side 47 are arranged one or more inlet apertures 50 passing through a tubular extension 51, to which is connected a conduit 52.

The agitation of the particles in this viewer is somewhat different from those described previously, in that air is actually blown into the viewer through one or more apertures 50 in tubular extension 51. The air passes through the compartment and out through passages 49.

While in the foregoing only a few specific constructions illustrated in the drawings are described, changes and improvements in the kaleidoscope and in its viewer compartment may be made without departing from the basic principle of the present invention of agitating or changing the relative position of the particles or objects to be viewed within the viewer compartment by exterior means, such as the flow or gusts of air directed through the viewer. What is claimed as new is:

1. A viewer for kaleidoscopes, comprising a triangular, substantially closed air chamber with oppositely disposed air apertures, objects to be viewed placed in the chamber, and air-flow-inducing means disposed externally relative to the viewer for agitating such objects within the chamber from without the latter without imparting any kind of movement to either the viewer or any other part of the kaleidoscope containing or connected with the viewer.

2. In a kaleidoscope of substantially triangular cross section, having an eye piece at one end, a viewer compartment at the opposite end, objects to be observed placed in the compartment, and means disposed externally to the viewer compartment for subjecting said objects to movement within the compartment without changing the position of any other part of said kaleidoscope, said means comprising an air conduit connected with said compartment and apertures in the latter to facilitate flow of air through said compartment for inducing movement of said objects, when air is forced through said conduit.

3. In a kaleidoscope, a viewer compartment containing mobile objects to be viewed, said compartment having oppositely disposed air passages, an aspirator connected with one of the passages and being adapted to draw air through said viewer compartment for agitating the objects contained therein.

4. In a kaleidoscope, a substantially wedge-shaped, hollow viewer compartment provided with oppositely disposed air passages, at least one of the passages being provided at the apex of compartment, at least another passage being located at substantially the center of the compartment base, an aspirator structure associated exteriorly with said base and connected with said other passage, means for conveying air through said aspirator and thereby drawing air through said passage at the apex into the compartment and from the latter to without, readily mobile objects placed in said compartment and being adapted to become agitated when the aspirator is being operated.

5. In a kaleidoscope having an elongated body including a chamber equipped with reflecting surfaces, a substantially closed viewer compartment at one end of the chamber and having oppositely arranged, relatively small air passages, said compartment containing objects adapted to be movable by air passing through the compartment by way of these passages, and means connected exteriorly with one of the passages and operative from without the kaleidoscope body for causing the movement of the objects within the viewer compartment.

6. In a kaleidoscope, an elongated body forming a chamber of substantially triangular cross section and provided interiorly with reflecting surfaces, a substantially closed viewer compartment containing movable objects, and corresponding in shape to that of the chamber and having oppositely disposed apertures, means externally disposed in respect to but operatively associated with one of the apertures of the viewer compartment and being operative from without the kaleidoscope for causing the movement of the objects within the compartment.

7. In a kaleidoscope, a viewer compartment having oppositely disposed air passages, an air conduit connected with one of the air passages for conveying air through the compartment and to without the latter through the opposite of the air passages, observable objects in said compartment adapted to be agitated therein by the passage of air through the compartment without the requirement of moving any part of the body of the kaleidoscope.

HARLOW B. GROW.

REFERENCES CITED

The following references are of record in the file of this patent:

UNITED STATES PATENTS

| Number | Name | Date |
|---|---|---|
| 174,690 | Macy | Mar. 14, 1876 |
| 183,550 | Earle | Oct. 24, 1876 |
| 495,822 | Meddins | Apr. 18, 1893 |
| 1,294,967 | Stabla | Feb. 18, 1919 |
| 1,414,469 | House | May 2, 1922 |
| 1,518,204 | Husted | Dec. 9, 1924 |
| 1,595,881 | Schultze | Aug. 10, 1926 |
| 2,066,548 | Thompson | Jan. 5, 1937 |
| 2,298,966 | Inackenbush | Oct. 13, 1942 |

FOREIGN PATENTS

| Number | Country | Date |
|---|---|---|
| 8,909 | Great Britain | May 3, 1893 |
| 395,796 | Great Britain | July 27, 1933 |